United States Patent [19]
Chen

[11] Patent Number: 5,095,408
[45] Date of Patent: Mar. 10, 1992

[54] VIDEO CAMERA ILLUMINATING ADAPTER

[76] Inventor: Stephen Chen, No. 52, Lane 563, Chang Chao Road, Changhua City, Taiwan

[21] Appl. No.: 655,596

[22] Filed: Feb. 15, 1991

[51] Int. Cl.$^5$ ............................................. G03B 15/02
[52] U.S. Cl. ........................................ 362/9; 362/10; 362/18; 354/126
[58] Field of Search .................. 362/3, 8, 9, 10, 18, 362/194, 226, 4, 11; 354/135, 149.1, 126; 358/909

[56] References Cited

U.S. PATENT DOCUMENTS 3,333,093 7/1967 Robinson ................................ 362/3
4,924,246 5/1990 Yamada ................................ 362/11

Primary Examiner—Stephen F. Husar
Attorney, Agent, or Firm—Browdy and Neimark

[57] ABSTRACT

A video camera illuminating device adapter incorporated with a video camera having a main body attachable on one side to a video camera and an illuminating device respectively and batteries attached to the opposite side. A simple circuit in the main body detects the video camera in use and by a control relay closes a looped circuit to turn on the illuminating device. The light source can be integral with the main body of the adaptor or portions of the main body can be locked at an angle to each other.

6 Claims, 4 Drawing Sheets

VIDEO CAMERA ILLUMINATING ADAPTER

BACKGROUND OF THE INVENTION

The present invention is related to a video camera illuminating device adapter, particularly to the kind which combines the lighting device and camera integrally.

Conventional, video camera is quite large in size, which results its heavy weight and immobility, and if additional light is desired when natural light is insufficient, the lighting or illuminating device will be an extra weight, and thus causes inconvenience for operation.

However, the portable video camera is gaining in use due to modern electrical technology. It becomes possible to have a light weight video camera as it is simplified due to the requirement of light weight and compact size. It is a disadvantage if additional light is desired since there is no attachment or means for combining video camera and illuminating device while keeping it in compact size.

Conventional illuminating devices are shown in FIGS. 1 and 2, which generally have a rectangular shape body provided with a light source in the front panel and a battery mounted on the back; a socket suitable for connecting to additional electrical power source; a ring-shaped switch to be positioned at the finger which is to activate the switch or trigger of the video camera so that the camera and illuminating device can be operated in the same time.

Although, this type of device can provide and accomplish an illuminating purpose, it is subject to one or more of the following disadvantages:

1. Due to its complexity in construction, it increases maintenance and manufacturing cost.
2. The switch is activated by the same finger which is to pull the trigger of a video camera. This results in inconvenience of operation.

SUMMARY OF THE INVENTION

The present invention utilizes a main body, of a generally rectangular shape, having one side attachable to a video camera and an illuminating device with the other side attachable to a battery; an electrical circuit, having a detecting circuit, a relay or breaker, and a switch disposed in the main body.

Whereas it is also possible to have a latch located at the substantial middle portion of the main body, so that lighting or illuminating device can be rotated about an axis of the latch.

It is also desirable to have an illuminating device incorporated with the main body for easy installation.

Therefore, it is an objective of the present invention to provide a means which is aimed to resolve the disadvantages of the conventional types.

It is still an objective of the present invention to provide an adapter to combine the illuminating device and the camera for compatibility.

DETAILED DESCRIPTION OF THE PREFERRED EMBODIMENTS

Figure 1:
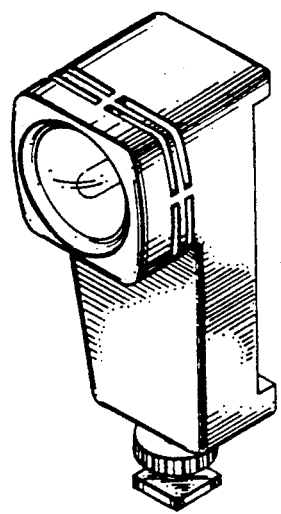
FIG. 1 is a perspective view of a conventional type of illuminating device.
Figure 2:
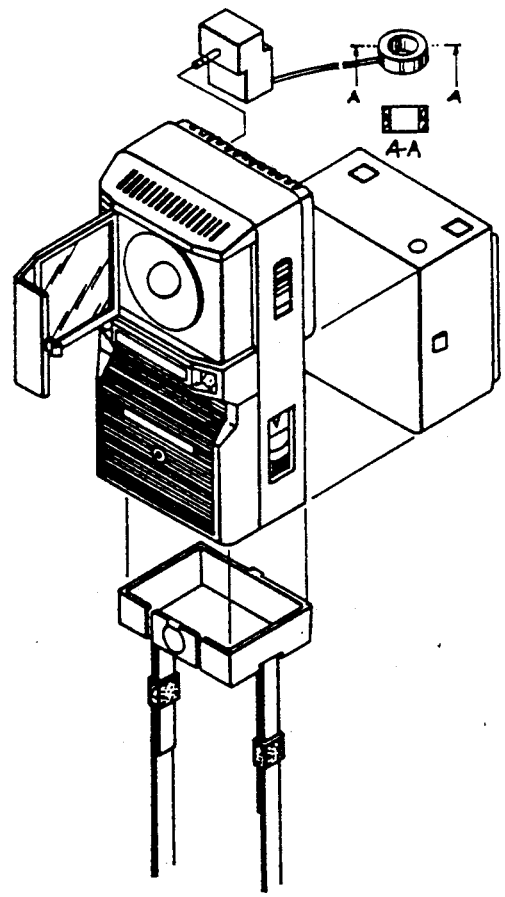
FIG. 2 is a perspective view of a conventional type related to the present invention.
Figures 3, 4:
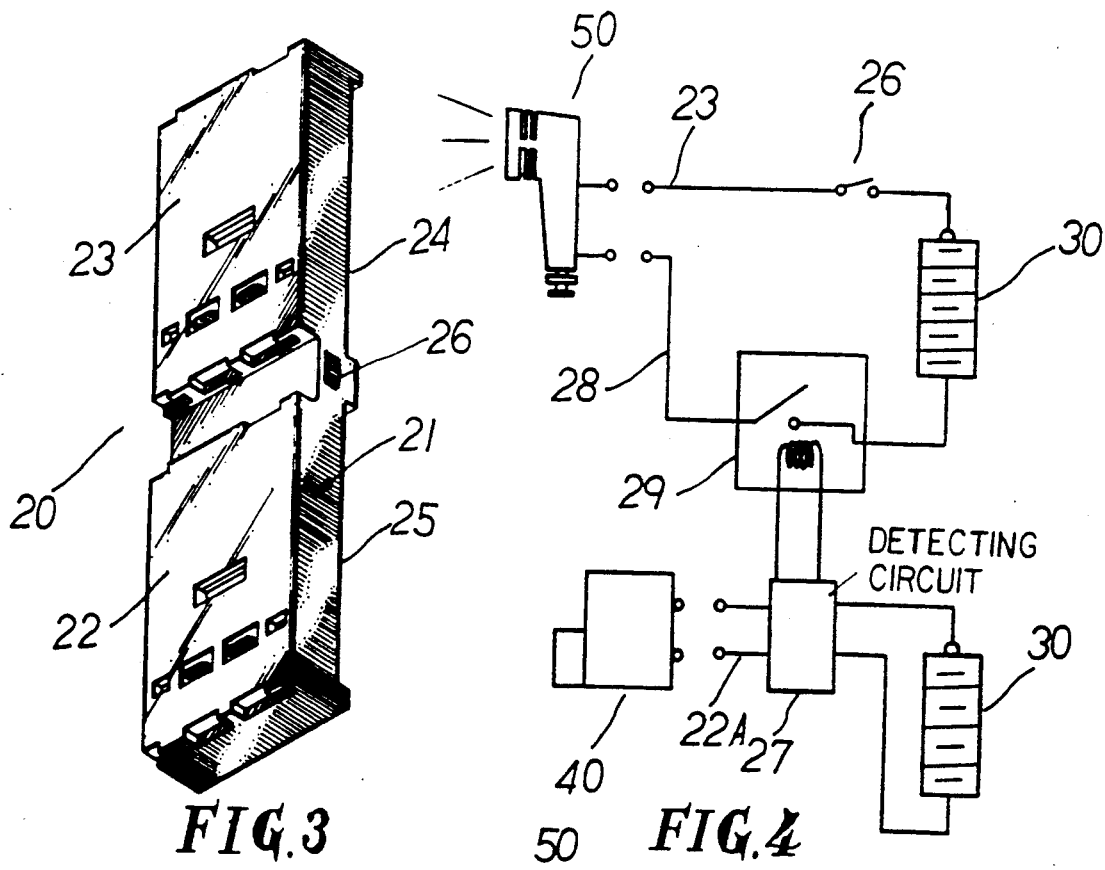
FIG. 3 is a perspective view of a first embodiment according to the present invention.
FIG. 4 shows an electrical circuit according to the present invention.

Referring to the drawings, and particularly to FIG. 3, a video camera illuminating device adapter comprises a main body 20, receiving walls 22 and 23 formed integrally on body 20 to be connected with a video camera and an illuminating device respectively, battery receiving ends 24 and 25 formed integrally on the opposite side of body 20 to allow insertion of respective batteries 30, a switch 26 mounted on a lateral side of said main body as permitted provided with a simple circuit, as shown in FIG. 4, consisting of a detecting circuit 27 connected with battery receiving end 25 and terminals 22A of receiving wall 22, and circuit 28 consisting of a relay 29, connecting to battery receiving end 25 and terminals 23A of receiving wall 23, switch 26, battery receiving end 24, with control relay 29 connecting to detecting circuit 27 to close the circuit.

Figure 5:
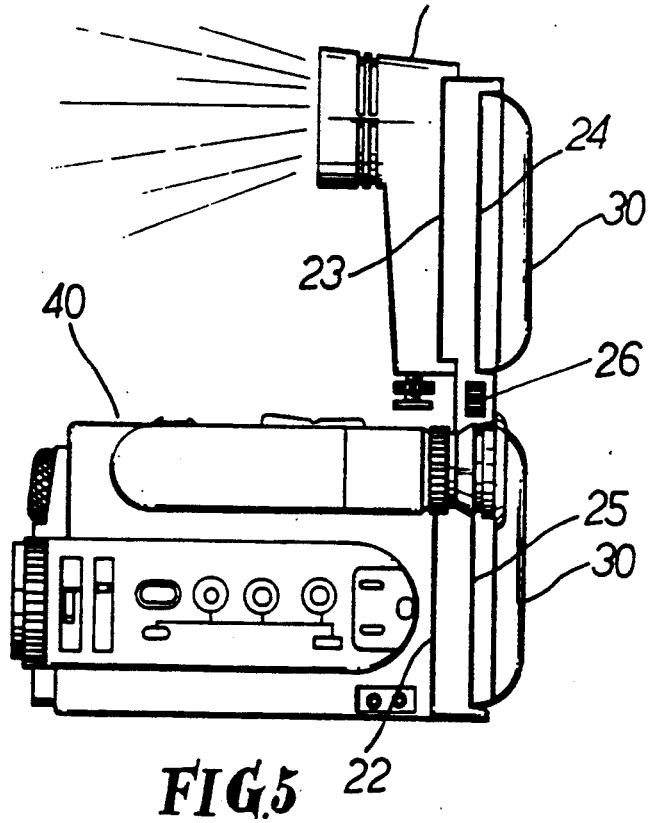
FIG. 5 is an elevational view of the first embodiment as in operation.
Figures 6, 7:
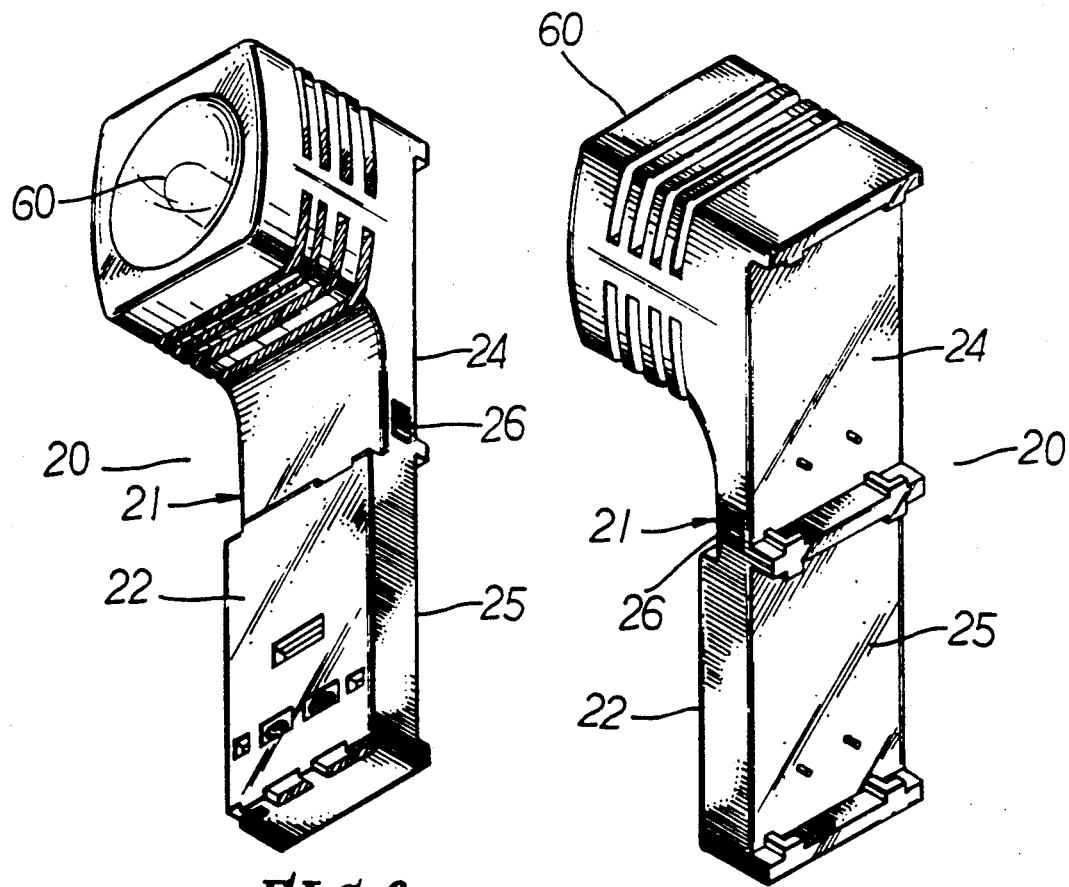
FIG. 6 is a perspective view according to a second embodiment of the present invention showing the front thereof.
FIG. 7 is a perspective view of the second embodiment of FIG. 6 showing the back thereof.

Turning now to FIGS. 4 and 5, as in operation, said receiving wall 22 is connected to video camera 40, while said receiving wall 23 is connected to an illuminating device 50. By moving said switch 26 to an ON position to facilitate the circuit in a closed loop, such that as when natural light is weak, the battery 30 attached on battery receiving end 25 can supply electric power to video camera 40 while detecting circuit 27 will detect the current different upon turning on said camera, and control relay 29 will activate circuit 28 so that lighting illuminating device 50 will light up simultaneously.

In contrast, as camera 40 is in OFF or waiting status, the detecting circuit 27 will inactivate relay 29 and put circuit 28 in an open loop.

If natural light is sufficient for operation, and no additional light source is needed, switch 26 can be turn to OFF position, such that whether camera 40 is ON or OFF will not affect illuminating device 50.

With a video camera illuminating device adapter having a main body 20 as disclosed immediately above, the upper receiving wall 23 can be combined with the illuminating device 60 as best shown in FIGS. 6, 7, 8 and 9, so that main body 20 is able to receive camera 40 to achieve the object in a way that combines the function of lighting convenience and ease of installation.

Figure 8:
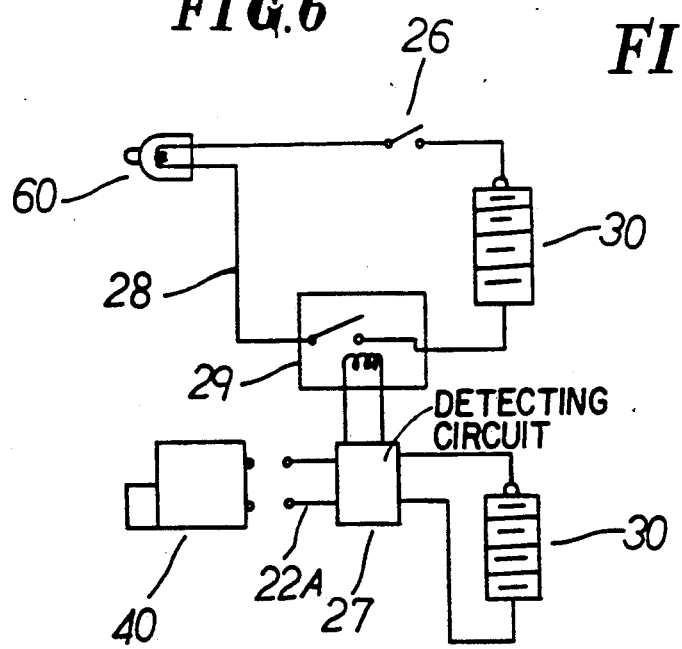
FIG. 8 is a circuit diagram of the second embodiment of the present invention.
Figure 9:
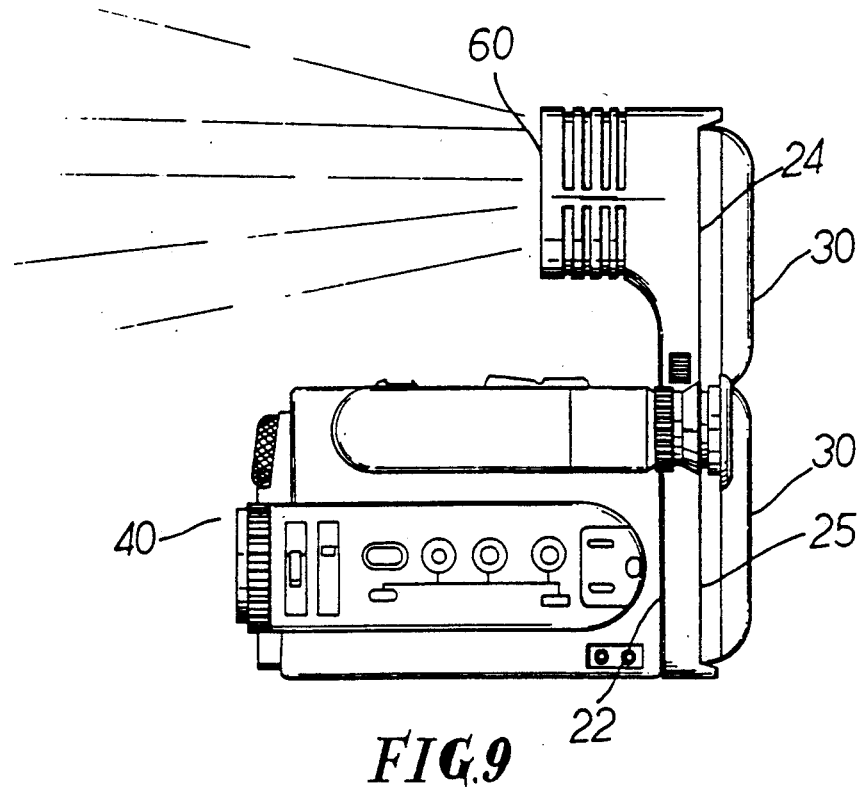
FIG. 9 is an elevational view according to the second embodiment as in operation.

Further referring to FIGS. 8 and 9, receiving wall 22 is connected to camera 40. As supplemental light is desired, switch 26 is turn to ON position, while detecting circuit 27 will function to detect the current difference of electrical power flowing through camera 40, control delay 29 will activate circuit 28 to light up illuminating device 60 instantly. Contrarily, as camera 40 is OFF or in a waiting status, detecting circuit 27 will inactivate relay 29 to put the circuit 28 in an open loop.

Figure 10:
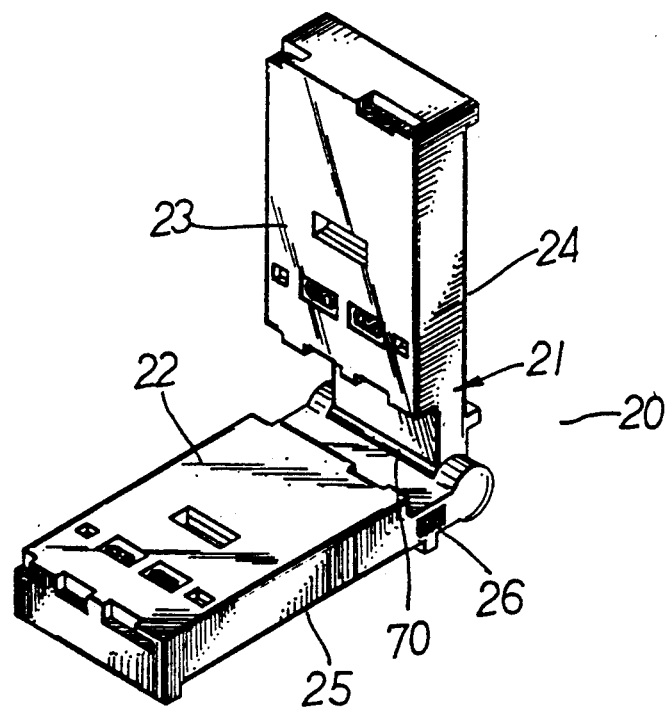
FIG. 10 is a perspective view of a third embodiment.

Turning now to FIG. 10, a video camera illuminating device adapter 20 has receiving walls 22 and 23 to be mounted with camera 40 and lighting device 50, and battery receiving ends to receive respective batteries for supplying power. However, sometimes it is preferable to have a different angle of light projection, as is illustrated below.

A latching means 70, which is set to perform the changing angle of an illuminating device, is substantially located at the middle of main body 20 to accomplish the predetermined objective.

It is to be understood that the invention is to be limited only by the following claims and their equivalent.

What is claimed is:

1. A video camera illuminating device adapter for connection to a video camera and an illuminating device comprising
    a main body having opposing faces and a side portion;
    first and second receiving walls formed integrally on one of said faces of said main body to be connected to the video camera and the illuminating device respectively;
    electrical terminals connected through said receiving walls;
    first and second battery receiving portions and a battery means for connection to said battery receiving portions with said battery receiving portions formed integrally on an opposite one of said faces of said main body from said first and second receiving walls;
    a switch mounted on a side portion of said main body;
    circuit means connected to said switch and to said electrical terminals to allow electrical current to activate the illuminating device upon closing of said switch and upon operation of the video camera with said switch closed
    whereby the illuminating device will operate only when said switch is closed but the video camera will operate in both the open and closed positions of said switch.

2. The video camera illuminating device adapter of claim 1 further comprising
    a latching means formed at substantially the center of said main body;
    said latching means rotatable to change the angle of the illuminating device.

3. The video camera illuminating device adapter of claim 1 wherein
    said second receiving wall includes the illuminating device as a light means integral with said main body.

4. The video camera illuminating device adapter of claim 1 wherein
    said circuit means includes
        a detecting circuit connected to one of said battery receiving portions and said electrical terminals of said first receiving wall,
        a control relay having a control means and a switch means with said control means connected to said detecting circuit;
        said switch means of said control relay connected in series with another of said battery receiving portions, said electrical terminals of said second receiving wall and said switch
    whereby with said switch closed, activation of the video camera causes said detecting circuit to detect a current which closes said switch means of said control relay thereby activating the illuminating device simultaneously with activation of the video camera.

5. The video camera illuminating device adapter of claim 3 wherein
    said circuit means is connected to said light means integral with said main body.

6. The video camera illuminating device adapter of claim 3 further comprising
    said circuit means including
        a detecting circuit connected to one of said battery receiving portions and said electrical terminals of said first receiving wall,
        a control relay having a control means and a switch means with said control means connected to said detecting circuit;
        said switch means of said control relay connected in series with another of said battery receiving portions, said light means, and said switch
    whereby with said switch closed, activation of the video camera causes said detecting circuit to detect a current which closes said switch means of said control relay thereby activating said light means simultaneously with activation of the video camera.

* * * * *